June 15, 1937.　　　　C. E. SUMMERS　　　　2,083,622
HEAT INSULATING MECHANISM
Filed Dec. 19, 1934　　　3 Sheets-Sheet 1
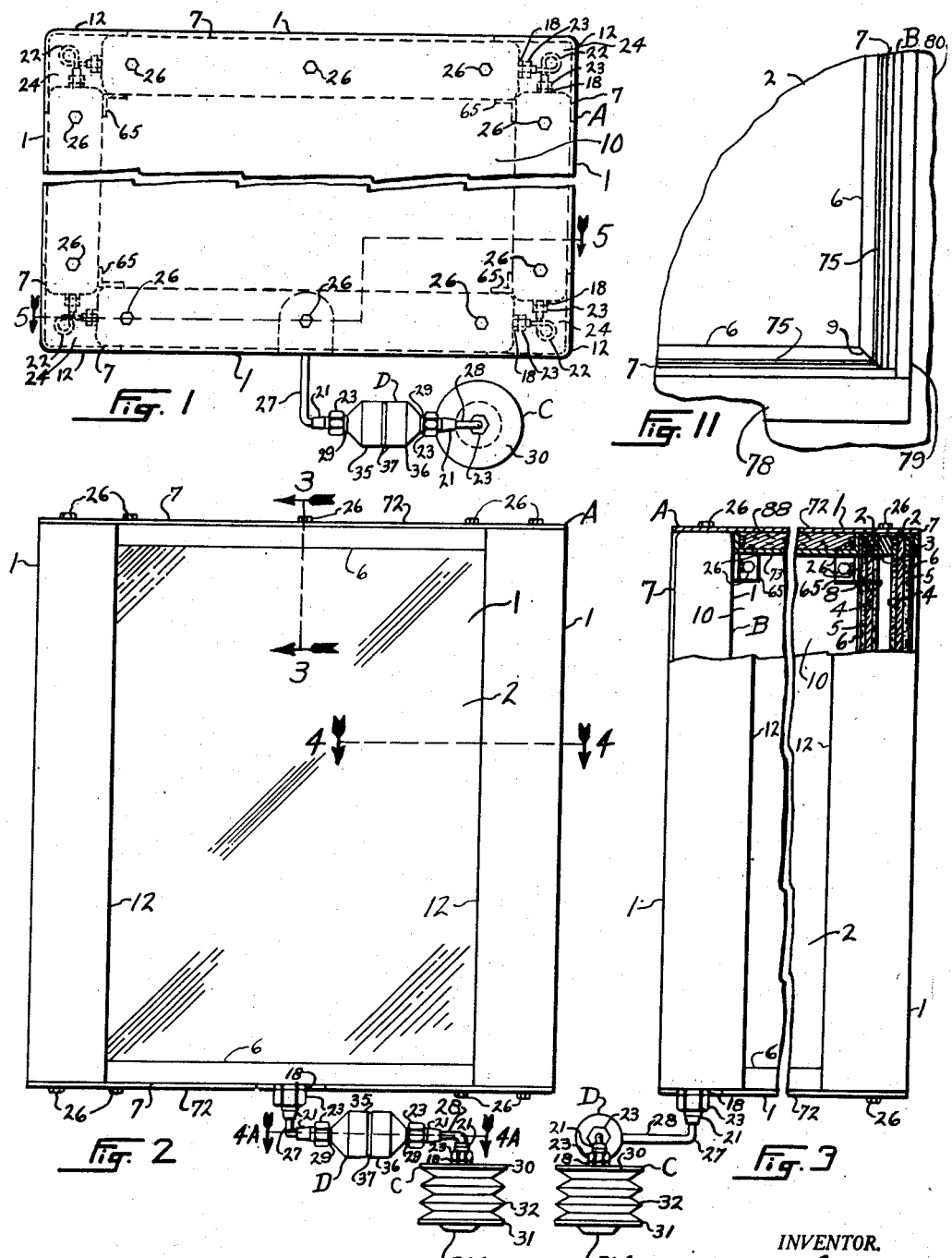
INVENTOR.
Caleb Edson Summers,
BY
George B. Ingersoll.
ATTORNEY.

June 15, 1937.  C. E. SUMMERS  2,083,622
HEAT INSULATING MECHANISM
Filed Dec. 19, 1934   3 Sheets-Sheet 2
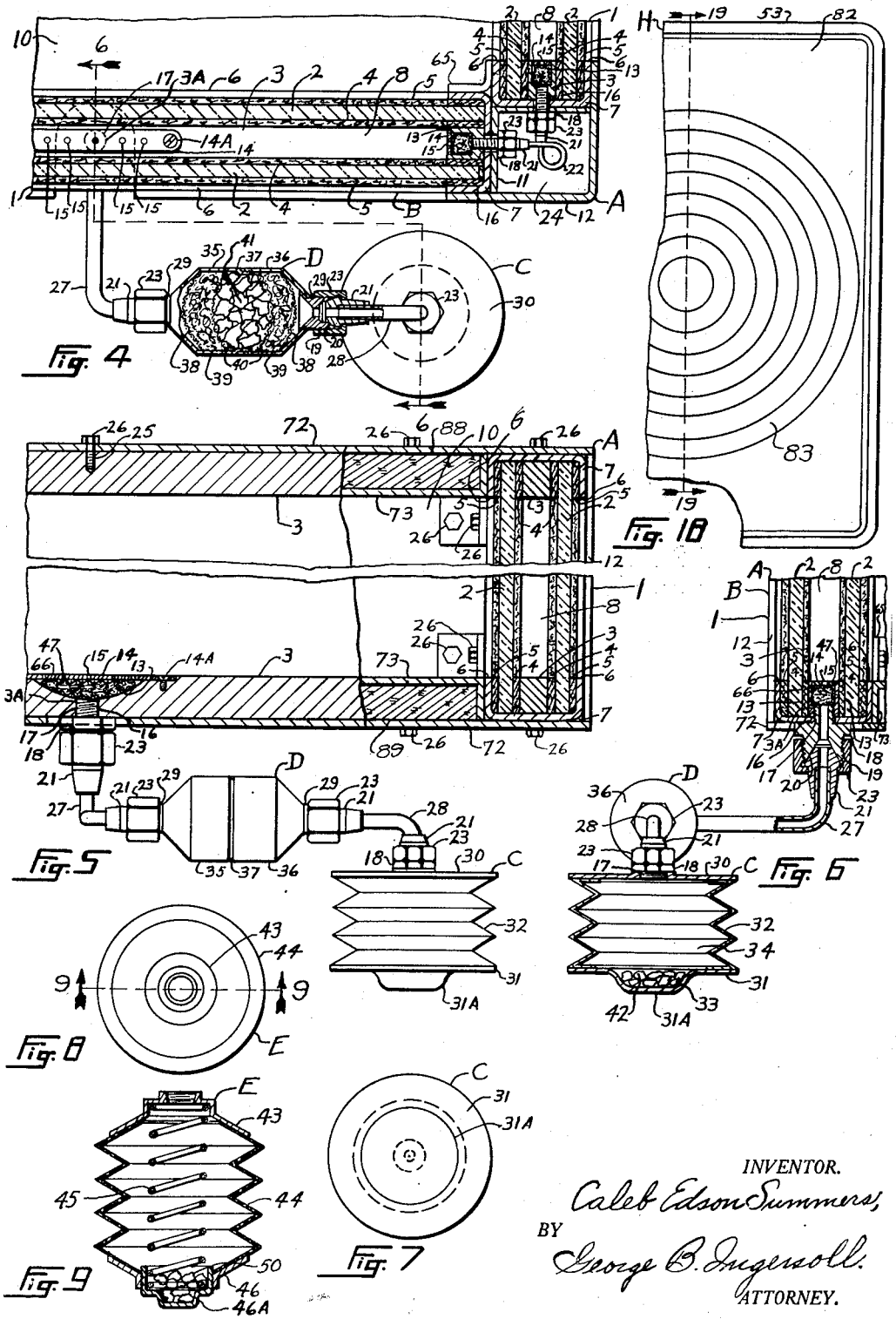
INVENTOR.
Caleb Edson Summers,
BY
George B. Ingersoll.
ATTORNEY.

June 15, 1937.  C. E. SUMMERS  2,083,622
HEAT INSULATING MECHANISM
Filed Dec. 19, 1934   3 Sheets-Sheet 3
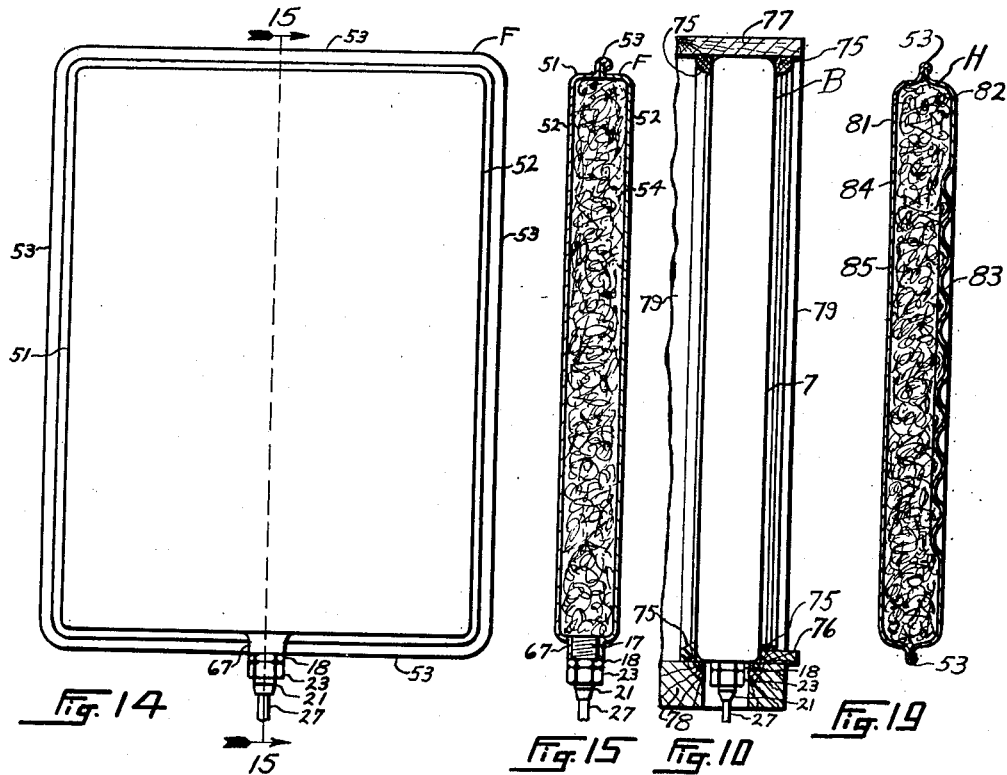
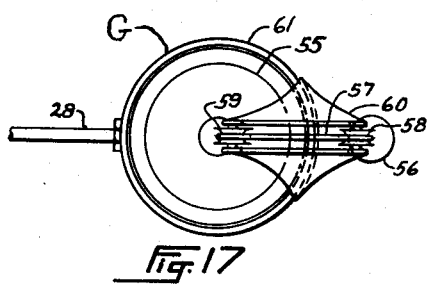
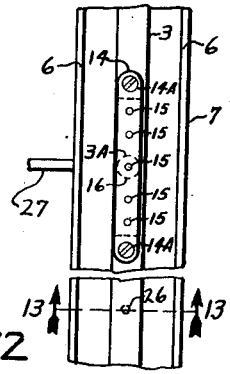
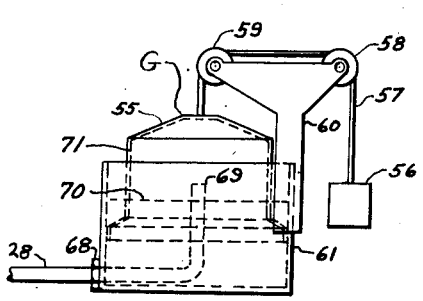
INVENTOR.
Caleb Edson Summers;
BY
George B. Ingersoll
ATTORNEY.

Patented June 15, 1937

2,083,622

UNITED STATES PATENT OFFICE 2,083,622

HEAT INSULATING MECHANISM

Caleb Edson Summers, Pontiac, Mich.

Application December 19, 1934, Serial No. 758,202

18 Claims. (Cl. 20—56.5)

My invention relates to improvements in a heat insulating mechanism or system in which a sealed room, compartment or chamber of a unit is enclosed by insulated windows, walls, or panels; and the objects of my invention are, first, to provide means whereby a sealed chamber is permitted to breathe in response to temperature and barometer changes without the introduction of moisture, dust, etc.; second, to provide a sealed chamber with an expansible chamber in communication therewith to compensate for the changes in volume of the air in the system in accordance with variations in barometer and temperature; third, to provide a sealed chamber with means for protecting the sealing mechanism thereof from pressures and strains tending to break the sealing means and causing air leaks; fourth, to provide a window having a sealed chamber with means for preventing moisture due to condensation from accumulating therein to detract from the transparency of the window; fifth, to provide a window having a sealed chamber with means for preventing dust, foreign matter, etc., from entering therein to detract from its transparency; sixth, to provide heat insulated mechanism, having a sealed chamber enclosed by opaque insulating panels, with means for maintaining the air in the sealed chamber in a dry and efficient condition; seventh, to provide a room or chamber, enclosed by insulated panels each having an air chamber therein, with means for connecting the air chambers together; eighth, to provide an enclosure having insulated walls, windows, or panels with means for equalization of the air pressure in the walls, windows or panels, without communication with the outside atmosphere; ninth, to provide a sealed chamber with pulsing mechanism, actuated by and in response to changes in barometer and temperature, for moving air in and out of the sealed chamber; tenth, to provide a sealed air chamber with a bellows mechanism having a drying agent therein; eleventh, to provide a sealed air chamber, connected with a bellows mechanism, with a filter mechanism connected therebetween; twelfth, to provide an air filter unit with an air drying agent therein; thirteenth, to provide a window, panel, or wall member mechanism having a sealed chamber therein with means for preventing the accidental entrance of dust, foreign matter, etc., into the sealed chamber when the mechanism is in a disassembled position as in shipping, etc.; fourteenth, to provide an air tight housing filled with heat insulation material with means for maintaining the heat insulation material always in a dry and efficient state; and fifteenth, to provide an air tight panel housing for use in a heat insulating mechanism and constructed as a self-contained unit to operate with expansible or bellows characteristics.

I attain these objects by mechanism illustrated in the accompanying drawings, in which:—

Figure 1 is a plan view of a chamber equipped with my heat insulating mechanism; Fig. 2, a side elevation of the chamber and heat insulating mechanism disclosed in Fig. 1; Fig. 3, an end elevation of the chamber and heat insulating mechanism disclosed in Figs. 1 and 2, together with a partial sectional view on the line 3—3, Fig. 2; Fig. 4, a partial sectional view of the chamber and heat insulating mechanism taken on the line 4—4, Fig. 2, said Fig. 4 further disclosing a horizontal sectional view of a filter unit on the line 4A—4A, Fig. 2, said Fig. 4 being drawn to a larger scale than that of Figs. 1, 2 and 3; Fig. 5, a partial sectional view of the chamber and heat insulating mechanism on the line 5—5, Fig. 1, said Fig. 5 being drawn to the same scale as that of Fig. 4; Fig. 6, a partial sectional view of the chamber and heat insulating mechanism on the line 6—6, Fig. 4, said Fig. 6 being drawn to the same scale as that of Figs. 4 and 5; Fig. 7, a bottom view of the expansible unit disclosed in Fig. 5; Fig. 8, a plan view of the expansible unit when constructed of fabric in the form of a bag; Fig. 9, a sectional view of the expansible unit, disclosed in Fig. 8, taken on the line 9—9, Fig. 8; Fig. 10, an outside end view of an individual panel assembly constructed and equipped with my invention, said window being assembled in a window frame structure; Fig. 11, a partial inside front view of and disclosing a corner of the window and window frame structure disclosed in Fig. 10; Fig. 12, a partial plan view of one of the frame members with a spacer assembled therein and without the plates therein; Fig. 13, a sectional view through one of the screws for holding the spacers and retainer members together, said sectional view being taken on the line 13—13, Fig. 12; Fig. 14, a side elevation of an opaque panel or capsule equipped with heat insulating mechanism; Fig. 15, a section of the opaque panel or capsule, disclosed in Fig. 14, on the line 15—15, Fig. 14; Fig. 16, a side elevation of a liquid sealed unit used as an expansible chamber; Fig. 17, a plan view of the liquid sealing unit disclosed in Fig. 16; Fig. 18, a partial front elevation of a panel housing constructed as a self-contained unit to operate with expansible or bellows characteristics; and Fig. 19, a vertical section of the panel housing disclosed in Fig. 18, said vertical section being taken on the line 19—19, Fig. 19.

Similar numerals refer to similar parts throughout the several views.

The heat insulating mechanism of my invention is herein disclosed as being connected with and forming a portion of a room or similarly enclosed chamber, compartment or space of a building, refrigerator, railroad car, motor vehicle, or similar units whether stationary or adapted to motion, said room or similar unit assembly being designated by A.

It is to be understood that my invention may be applied to and in connection with a window of an air conditioned building or similar unit or it may be applied to all of the walls of the room assembly A, whether said walls are transparent or opaque.

Also said invention is adapted for connection and operation with any enclosure in which the temperature is lower or higher than the temperature of the atmosphere outside of said enclosure.

The walls or windows 1 of the room assembly A are formed by the use of the plates 2 which may be constructed of glass, where the window or walls 1 are to be transparent, or they may be of opaque material where transparency is not desired and the walls 1 are utilized principally for enclosure purposes.

To simplify the disclosure, the walls 1 of the room assembly A are shown as being constructed of glass or similar transparent or translucent material.

The plates 2 are spaced by the spacer or member 3 together with the sealing members 4 and 5 which may be constructed of felt, cork, rubber, or similar material having resilient compressive or deformable characteristics suitable for sealing purposes. The sealing members 4 are located between the sides of the spacer 3 and the inside surfaces of the plates 2 and the sealing members 5 are located between the outside surfaces of the plates 2 and the inside surfaces of the flanges 6 of the retainer member 7, the retainer member being constructed with a U section and is of the proper dimensions to exert a clamping pressure on the sealing members to force or tension the plates 2 toward one another, thus further compressing the sealing members 5 between the plates 2 and the spacer 3.

It is to be noted that the retainer member 7 will extend entirely around the peripheries of the multiple plates 2, thus forming a frame member for the assembly, and when assembled with the spacer 3 and sealing members 4 and 5, will seal the edges of the plates 2 to form a sealed air chamber 8 between said plates 2. When an individual window, for use in a window frame structure, is equipped with my invention, said window assembly B will be constructed to appear as disclosed in Figs. 10 and 11, the flanges 6 of the retainer members 7 being suitably joined or connected together as at 9 by welding or similar suitable means to make a frame for the window unit. However, when the walls or windows 1 are utilized to enclose and form a chamber 10 in the room assembly A. The assemblies B may be located adjacent one another and connected together at their corners by the brackets 11 together with the corner plates 12 and brackets 65 as disclosed in Figs. 1, 2, 3, 4, and 5. The corner plates 12 together with the assemblies B form a chamber 24 which is utilized to contain the means for connecting the chambers 8.

It is to be understood that all of the air chambers 8 of the room assembly B will be connected together, Fig. 4 disclosing in detail one connection between two of the chambers 8. Whereas various detail means may be utilized for connecting the chambers 8, the construction disclosed and more clearly described hereinafter is indicative of the general construction required in such installations. However, it is to be noted that it will be desirable to locate the assemblies B in the indicated manner in which said assemblies B will have substantially equal areas of frame portions exposed to view on all of the sides of the room assembly A. The spacers 3 are each suitably provided with the chambers 13 which may be covered at their inner sides by the plates or members 14 suitably connected to the spacers 3 by the screws 14A and provided with suitable openings 15 to provide communication between the chambers 13 and the chambers 8. The retainer members 7 are provided with a plurality of holes 16 through which extend the members 17 which threadably engage the threaded holes 3A of the spacers 3 and by means of the flanges or heads 18 secure the retainer members between said flanges 18 and said spacers 3, the flanges 18 being adapted to be engaged by a wrench for assembling the members 17. The members 17 are each provided with the threaded ends 19 having the angular surfaces 20 which are adapted to be engaged by similar angular surfaces on the members 21 which are suitably connected to tubes, such as indicated at 22 in Fig. 4, as by soldering or similar means, said members 21 being engaged and forced to their assembled and air tight positions by the nuts 23 which threadably engage the threaded ends 19.

The mechanism herein disclosed for connecting the tube or conduit 22 is similar to one of many conventional tubing connections and any similar means may be utilized for this purpose.

The spacers 3 in each of the assemblies B will be provided with a suitable number of chambers 13 for enabling a plurality of tubes 22 to be utilized, if desired, for providing communication between the chambers 8 of the assemblies B, and if desired the members 17 may be located with their axes in different planes to facilitate the assembly of the tubes 22 in the chambers 24.

If it is desired, further means may be provided for fastening the spacers 3 and the retainer members 7 together, as by the screws 25 as disclosed in Fig. 13, the screw 25 threadably engaging the spacer 3 to secure the retainer member 7 between the spacer 3 and the head 26 of the screw 25.

It is now to be noted that the chamber 8 of the window or wall assembly B or of one of the assemblies B of the room assembly A will be connected, by the tubes or pipes 27 and 28, to the expansible chamber assembly C which operates in the manner of a bellows or similar device of like function, said expansible chamber assembly C being located in any desired or convenient position such as in an attic, basement or in the wall of a room adjacent any of the walls of the room assembly A.

It is to be noted that the tube 27 will be preferably connected to one of the spacers 3 at the bottom side of one of the window or wall assemblies B as disclosed in the various figures, a member 17 and its associated parts being utilized to make an air tight connection similar to the mechanism disclosed in Figs. 4, 5, and 6.

Also the tube 28 will be connected to the expansible chamber assembly C in a similar manner. Also the other ends of the tubes 27 and 28 will be connected to the threaded members 29 at the ends of the filter assembly D.

The expansible chamber assembly C is provided with the disc 30, which is secured to one of the members 17, and the disc 31, said discs 30 and 31 being suitably attached to the bellows member 32 which is constructed of suitable flexible and convoluted material, such as resilient metal, to provide the necessary expanding and contracting movements. The disc 31 may be provided with the depressed portion or boss 31A having the recess 33 for the purpose hereinafter disclosed.

It is to be noted that the expansible chamber assembly C will provide a sealed chamber 34, the volume of which will be subject to variation by very light or sensitive pressures exerted thereon.

It is also to be noted that the capacity of the expansible chamber assembly C must be equal to or in excess of the maximum volume change in the air contained in the chamber or chambers 8 to accommodate extreme changes in temperature and barometer. For example, if the volume of the air contained in the chamber or chambers 8 is equal to one cubic foot and the temperature is assumed to vary from 20° to 110° Fahrenheit and the barometer is assumed to vary from 28 inches to 31 inches of mercury, then the expansible chamber assembly C must have a capacity of approximately one half cubic foot, thus permitting an equalization of pressure between the chamber or chambers 8 and the outside atmosphere without actual communication with the outside atmosphere which would permit the introduction of dust, moisture, etc.

The filter assembly D is located in the line of communication between the expansible chamber assembly C and the window assembly B or the room assembly A to arrest and prevent any particles of dust, etc., from passing or travelling from the expansible chamber assembly C to the chambers 8.

The filter assembly D is constructed with the housings 35 and 36 having tapered end portions each connected to one of the threaded members 29, said housings 35 and 36 being telescoped one within the other and suitably connected at 37. The members 38 are constructed of wire mesh and are suitably secured to the inside wall surfaces of the housings 35 and 36, said members 38 being adapted to retain the filter material 39 which may be constructed of hair, fabric, metal wool or similar material and adapted to permit the passage of air therethrough but capable of arresting or preventing the passage of dirt or foreign matter therethrough. The container 40 is located between the filter materials 39 and contains the material 41 which is a drying chemical or agent, such as quick lime or similar material and adapted to trap or absorb any moisture in the sealed chambers with which the filter assembly D is connected.

The recess 33 of the disc 31 of the expansible chamber assembly C is also utilized for receiving and containing the material or drying chemical or agent 42 which acts similarly to the material 41 of the filter assembly D, said material 42 being adapted to trap or absorb any moisture within the expansible chamber assembly C and which has not been trapped or absorbed by the material 41.

Figs. 8 and 9 disclose an alternate construction of an expansible chamber assembly E which is provided with the cup member 43, having a threaded portion for connecting with one of the members 17 for connection with the tube 28, together with the cup member 46.

The expansible chamber assembly E is constructed of convoluted fabric material 44 which may suitably be attached to the cup members 43 and 46 and sealed against the passage of air therethrough by means of a coating of nonhardening varnish, rubber compound or similar material, the fabric material 44 forming a bag or container which is distended by the spring 45, which may be constructed of relatively light tension to insure its being actuated compressively by sensitive pressures and to permit said spring 45 to also actuate the bag in a distending movement in response to sensitive changes in the air pressure. The cup members 43 and 46 are each provided with a cylindrical space for receiving and retaining the ends of the spring 45. Also when desired, the cup member 46 may be provided with the retainer 46A threaded therein to provide adjustment of the tension of the spring 45. If the expansible chamber assembly E is used, a quantity of the drying agent may be placed therein as indicated at 50, Fig. 9.

It is to be noted that the chamber 13 of the spacer 3 to which the tube 27 is connected is provided and filled with the filter material 47 similar to the filter material 39 and suitably retained in the container 66, said filter material thus sealing the chamber or chambers 8 against the accidental entrance of dust, foreign material, etc., when the mechanism of my invention is disassembled, as for instance, during shipment or prior to actual installation. It is to be understood that the filter materials 39 and 47 must be free of any substance or characteristics which would be influenced by age or temperature to give off any particles of dust, volatile or foreign matter which would tend to cloud the transparent or translucent qualities of the plates 2.

It is to be further understood that considerable liberty may be exercised in providing various locations and arrangements of the expansible chamber assemblies C or E with respect to the window assembly B or room assembly A with which one of them is connected without departing from the spirit and principle of my invention. Thus if more convenient and to be desired, the windows or wall portions of the room assembly A may be connected to one another and to a relatively large expansible chamber assembly, as indicated in the drawings of my invention, or one chamber 13 of each window or wall portion of the room assembly A may be connected with an individual expansible chamber assembly, the size and capacity of the expansible chamber assembly varying with the volume of the chamber or chambers 8 with which it is connected.

When my invention is to be used in conjunction with opaque panels, the panel assembly F may be constructed as disclosed in Figs. 14 and 15. The housing or casing 51 is constructed from a pair of container or pan members 52 made from suitable material, such as pressed metal, glass, porcelain or enamel ware, having flanges 53 which may abut one another and be secured together as by welding or similar means, the flanges 53 extending around the periphery of the housing 51 and resulting in a very rigid construction of housing or casing 51.

The housing 51 is filled with a suitable insulating material 54, such as fiber or similar insulating material. If desired one of the flanges 53 may be overlapped over the edge of the other to insure air tight housing F, as disclosed in Fig. 15.

The panel assembly F will be connected at its lower side to the tubing 27, by means of one of the members 17 connected to the boss 67 formed in the members 52, said tubing being further connected with the filter assembly D and the expansible chamber C or equivalent mechanism.

It is to be noted that when the panel assembly F is connected with the expansible chamber assembly C or equivalent unit, the resulting operation will be similar to that as hereinbefore disclosed, with the result that the heat insulating material 54 will be maintained in a dry and efficient state. The panel assemblies F may be utilized for forming the enclosing wall structure of such units as refrigerators, etc., the panel assemblies F being fitted and supported in suitable framework of the unit forming the enclosure.

The chambers 88 and 89 at the top and bottom portions of the room assembly A may be either connected with adjacent chambers or individually connected with an expansible chamber assembly C, or said chambers 88 and 89 may be filled with an insulating material such as cork, fibre, etc., the drawings disclosing the chambers 88 and 89 as being filled with such insulating material in order that the total sides of the room assembly may be insulated.

Figs. 16 and 17 disclose an alternative design of an expansible chamber assembly G which is constructed similarly to a gasometer in which non-volatile liquid such as mercury or similar material is sealed, the upper housing 55 being counterbalanced by the weight 56 connected to the line or cable 57 operating over the pulleys 58 and 59 supported by the cross bracket 60 secured to the lower housing 61, the line 57 being connected to the upper housing 55. The tube 28 leading to the filter assembly D is suitably connected to the lower housing 61 of the expansible chamber assembly G by means of a packing nut or member 68, the end 69 of the tube 28 extending upwardly to a point located above the line 70 which indicates the lever of the mercury or similar liquid used for sealing the housings 55 and 61. Thus the mechanism disclosed in Figs. 16 and 17 will provide the sealed chamber 71, the volume of which will be subject to variation by very light or sensitive pressure due to changes in barometer or temperature of the air in the system of which the sealed chamber 71 forms a part.

It is to be noted that the top and bottom portions of the room assembly A may be formed of members 72 secured to the upper and lower surfaces of the panel assemblies forming the sides and ends of the room assembly A.

In Figs. 10 and 11, the window assembly B is assembled individually in a window frame construction, the window assembly B being retained by the strip members 75 and the ledge member 76 which are connected with and supported by the sill members 77, 78 and 79 of the window frame structure of the building structure 80.

Figs. 18 and 19 disclose the panel housing assembly H constructed as a self-contained unit having expansible or bellows characteristics and which is constructed with the pair of container or pan members 81 and 82, which are similar to the container or pan members 52 of Figs. 14 and 15 and have the flanges 53 for securing the container or pan members 81 and 82 together. The container or pan member 82 is provided with the convolutions or corrugations 83 which may be arranged circularly therein, said convolutions or corrugations 83 permitting a contracting and expansible movement due to changes in barometer or temperature of the air in the panel housing assembly H, the chamber 84 being filled with the insulating material 85 which is preferably of suitable material which will stand up and maintain its position such as corrugated paper or similar material. The panel housing assembly H thus may be used as a self-contained unit having contracting and expansible characteristics and will be especially adapted for installation in such constructions as the door of a refrigerator, windows, etc., where it is difficult or not feasible to connect the panel housing assembly to an external expansion chamber unit such as disclosed in Figs. 1, 2, 3, 4, 5 and 6, or where considerations of economy or similar reasons would dictate an individual and self-contained panel assembly H.

In operation, the expansible chamber assembly C, G or E is set in accordance with the temperature and barometer at the time of installation, as for example, if the weather is extremely hot and the barometer unusually low, the expansible chamber assembly is installed at substantially its maximum capacity, or if the weather is extremely cold and the barometer is very high, the expansible chamber assembly is installed in substantially a collapsed position or condition, the manufacturer of my invention supplying a chart disclosing the proper expansion of the expansible chamber assembly to accommodate various temperatures and barometers to facilitate installation of the mechanism. After the expansible chamber assembly has been connected with the chamber or chambers 8, the expansible chamber assembly will increase or decrease in volume with an expanding or contracting movement to accommodate variations in the barometer and temperature of the air sealed in the chamber or chambers 8 of the system, thus eliminating any strains or undue pressures on the plates 2 and their sealing mechanism which in turn tend to cause leaks, the gradual pulsing of the air to and from the chamber or chambers 8 in response to and in accordance with changes or variations in the temperature and barometer causing any moisture in the chamber or chambers 8 to be carried therefrom and trapped or absorbed by the materials 41 or 42. Also any dust, foreign matter, etc., is prevented from entering the chamber or chambers 8.

The elimination of moisture, dust, foreign matter, etc., from the chamber or chambers 8 prevents any impairment of the desired transparent or translucent characteristics of the plates 2 when used as a window and also maintains the air or other insulating material when used in conjunction with the opaque plates 2 in a dry and efficient condition.

I claim:

1. In a heat insulating mechanism for a room, the combination of plate members forming wall portions of the room, members spacing said wall portions to form chambers therebetween, means for sealing said plate members, an expansible chamber actuated by changes in barometer and temperature of the air in the heat insulating mechanism, conduit means connecting said expansible chamber with said chambers formed by said plate members, a filter connecting with said conduit means for separating dust and similar material from the air passing therethrough, and a drying agent for trapping moisture in the air of the heat insulating mechanism.

2. In a heat insulating mechanism, the combination of a wall unit having an air tight chamber therein and an expansible chamber communicating with said air tight chamber of said wall unit, said expansible chamber being responsive to variations in the barometer and temperature of the air in the heat insulating mechanism, and a filter member connected between said air tight chamber of said wall unit and said expansible chamber for separating dust and similar material from the air in the heat insulating mechanism.

3. In a heat insulating mechanism, the combination of a window provided with an air tight chamber therein and provided with a closed passage connecting therewith, said passage being normally adapted to permit the flow of air to and from said air tight chamber due to variation in barometric and temperature conditions, and means for preventing dust or similar foreign material from entering said air tight chamber when said passage is not closed.

4. In a heat insulating mechanism, the combination of a window provided with an air tight chamber therein, filter means for preventing dust or similar foreign material from entering said air tight chamber, said means being located in said window, and a container enclosing said filter means and adapted to permit a flow of air therethrough.

5. In a heat insulating mechanism, the combination of a pair of plate members, a spacer member between said plate members, said spacer member being provided with a chamber communicating with the space between said plate members, means for sealing said plate members at their peripheries, a frame member for retaining said plate and spacer members together with said means, and filter material in the chamber of said spacer member for trapping dust and similar foreign material.

6. In a heat insulating mechanism, the combination of a wall assembly for a compartment, said wall assembly being provided with an air tight chamber therein, an expansible chamber responsive to variations in the barometer and temperature of the air in the heat insulating mechanism, a housing communicating with said air tight chamber of said wall assembly and said expansible chamber, filter material in said housing for separating dust and similar foreign material from the air passing through said housing, and a drying agent in said housing for trapping moisture in the air passing through said housing.

7. In a heat insulating mechanism, the combination of a housing adapted to permit the air in the heat insulating mechanism to pass therethrough, a pair of mesh members in said housing, a pair of filter members between said mesh members, for separating dust and foreign material from the air passing through said housing, a container between said filter members, and a drying agent in said container for trapping moisture in the air passing through said housing.

8. In a heat insulating mechanism, the combination of a pair of housings each having a flange extending around its periphery, means for securing the flanges of said housings together to form an air tight chamber between said housings, heat insulating means in said air tight chamber, and an expansible chamber communicating with said air tight chamber, said expansible chamber being responsive to variations in the barometer and temperature of air, said expansible chamber preventing the absorption of moisture by said heat insulating means.

9. In a heat insulating mechanism, the combination of insulating material, means for enclosing said insulating material in an air tight chamber, and means for compensating for the expansion and contraction of the air in said air tight chamber due to changes in barometric and temperature conditions to prevent the absorption of moisture by said insulating material.

10. In a heat insulating mechanism for a unit provided with a sill structure, the combination of a housing structure retained in said sill structure and provided with a pair of oppositely disposed wall portions, one of said oppositely disposed wall portions having a corrugated portion adapted to pulsate in response to changes in barometer and temperature of the air in said housing structure, and insulation material contained within said housing structure.

11. In a heat insulating mechanism for a window, the combination of a pair of transparent plates, a spacer member between said pair of transparent plates and provided with a chamber connecting with a passage extending to the outside of the heat insulating mechanism, sealing members between adjacent surfaces of said transparent plates and said spacer member, sealing members adjacent the outer peripheral side surfaces of each of said pair of transparent plates, a retainer member having inwardly extending flanges at its outer sides and engaging the outer side surfaces of said second mentioned sealing members, said inwardly extending flanges of said retainer member exerting pressure to clamp said spacer member, said pair of transparent plates and said first mentioned and said second mentioned sealing members together to render air tight the space between the said pair of transparent plates, said air tight chamber communicating with said chamber of said spacer member, and a filter material retained in said chamber of said spacer member to prevent dust and similar foreign material from entering through said passage and into said air tight chamber when said passage is not otherwise closed to the entrance of dust and similar foreign material from the outside atmosphere.

12. In a heat insulating mechanism for a window, the combination of a pair of transparent plates sealed to form an air tight space therebetween, an expansible chamber connected solely with said air tight space between said pair of transparent plates and responsive to variations in barometer and temperature conditions, a filter member connected between said expansible chamber and said air tight space between said pair of transparent plates, and a drying agent located in said expansible chamber for trapping moisture in the air of the insulating mechanism after it has passed through said filter member.

13. In a heat insulating mechanism, the combination of a pair of plate members, a spacer member between said pair of plate members and provided with a chamber connecting with a passage extending to the outside surface of the heat insulating mechanism, means for sealing said pair of transparent plate members and said spacer member together to form an air tight chamber, and a filter material retained in said chamber of said spacer member to prevent dust and similar foreign material from entering through said passage and into said air tight chamber when said passage is not otherwise closed to the entrance of dust and similar foreign material from the outside atmosphere.

14. In a heat insulating mechanism, the combination of a member provided with an air tight chamber therein, an expansible chamber responsive to changes in barometric, temperature, or similar conditions and connected with said air tight chamber, and means for preventing dust or similar foreign material from entering said air tight chamber when said expansible chamber is disconnected from operation with said air tight chamber.

15. In a heat insulating mechanism provided with an expansible chamber connected therewith, the combination of a plurality of wall panels each provided with an air tight chamber, means for securing said wall panels together, said means forming chambers at adjacent edge portions of said wall panels, conduit means connecting the air tight chambers of said wall panels having adjacent edge portions, said conduit means extending through said chambers adjacent the edge portions of said panels, and means connecting one of said air tight chambers with said expansible chamber.

16. In a heat insulating mechanism, the combination of a housing forming a wall panel having an air tight chamber, heat insulator material filling said air tight chamber, and an expansible chamber communicating with said air tight chamber of said housing to prevent the absorption of moisture by said insulator material, said expansible chamber being responsive to changes in barometer and temperature of air in said air tight chamber of said housing.

17. In a heat insulating mechanism, the combination of a pair of wall portions secured together by an interlocked flange portion to form a closed chamber therebetween, one of said pair of wall portions being provided with convoluted portions to permit said wall portion to pulsate in response to variations in barometer or temperature conditions of air within said closed chamber, and insulating material in said closed chamber, said pulsation of said wall portion preventing the development of moisture in said insulating material.

18. In a heat insulating mechanism for a building structure provided with an opening therein, a housing providing a closed chamber, said housing being provided with a wall portion extending across said opening of said building structure and having flexible characteristics to permit said wall portion to pulsate in response to variations in barometer or temperature conditions of air within said closed chamber.

CALEB EDSON SUMMERS.